May 23, 1950     S. A. ZIMMERMANN     2,509,027
OVERLOAD PROTECTION FOR METERS
Filed Dec. 24, 1948
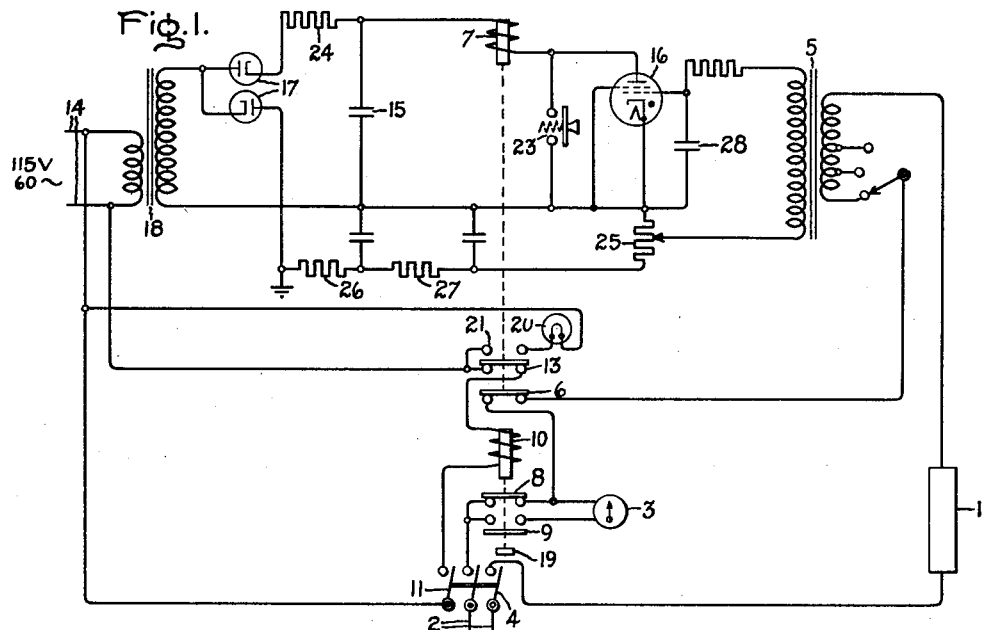
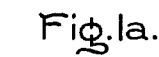
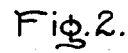
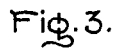
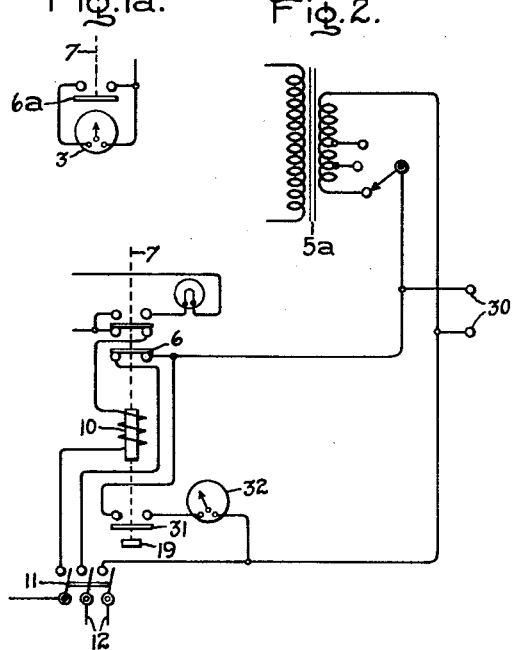
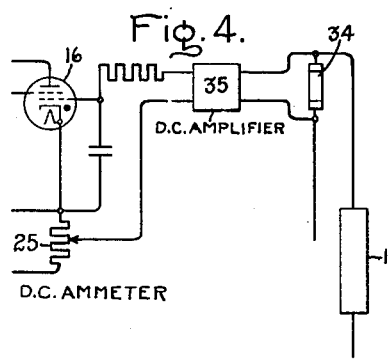
Inventor:
Steven A. Zimmermann,
by Crowell S. Mack
His Attorney.

Patented May 23, 1950

2,509,027

UNITED STATES PATENT OFFICE 2,509,027

OVERLOAD PROTECTION FOR METERS

Steven A. Zimmermann, Fort Wayne, Ind., assignor to General Electric Company, a corporation of New York Application December 24, 1948, Serial No. 67,155

5 Claims. (Cl. 175—294)

1

My invention relates to an overload protection system for electric meters, relays and the like, and its object is to prevent damage to electric meters both when the circuit being metered is initially closed or after the circuit has been closed and a short circuit or other overload condition develops, of such character as to cause injury to the meter if not protected.

It is a further object of my invention to afford protection to electric meters and the like not only against damage to its coils due to excessive heating, but also to provide a protection scheme that is sufficiently quick-acting as to prevent mechanical damage, such, for example, as to prevent the pointer of an indicating instrument in the circuit being metered from being bent due to slamming of the pointer against the upscale stop.

The features of my invention which are believed to be novel and patentable will be pointed out in the claims appended hereto. For a better understanding of my invention, reference is made in the following description to the accompanying drawing in which Fig. 1 represents an embodiment of my invention arranged for the protection of an alternating current ammeter used to measure the current in a test circuit, where the meter circuit is prevented from closing and is quickly opened if closed in case the load current is or becomes excessive. Fig. 1a is a modification that may be used with the circuit of Fig. 1 for short circuiting the ammeter. Fig. 2 represents modifications of the connections of Fig. 1 to adapt it for alternating current voltmeter protection. Fig. 3 represents modifications of the connections of Fig. 1 to adapt it for direct current voltmeter protection, and Fig. 4 represents modifications of the connections of Fig. 1 to adapt it for direct current ammeter protection.

Referring now to Fig. 1, it is assumed that 1 represents an impedance such, for example, as a load ballast for use with fluorescent lamps, and it is being tested to see if the ballast is within the required range of impedance. 2 represents a source of test voltage and 3 an ammeter for measuring the current through the test circuit and impedance 1. The test or load circuit may be traced as follows: through the right-hand blade 4 of a triple-pole switch 11, through the impedance 1 to be tested, through a desired portion of the primary of a small current transformer 5, thence through the lower normally closed contacts at 6 of a quick-acting relay 7, through either the upper contacts at 8 or the alternating current ammeter 3 and lower contacts at 9 of a time delay relay 10, through the middle pole of the switch 11 and then to the source of test voltage 2,

2 here assumed to be an alternating current voltage of the desired magnitude and frequency for the test involved.

The coil of relay 10 is energized through the left pole of the switch 11 and the normally closed contacts at 13 of the relay 7 from a source of supply 14 which may be either A.-C. or D.-C., but here assumed to be A.-C. When suitable, the sources 2 and 14 may be the same. The coil of relay 7 is energized from a condenser 15 through an electron discharge tube 16 of the gaseous type when the tube fires, and the condenser is kept charged through rectifiers at 17 from source 14 through a transformer 18. The control grid of tube 16 is connected to the secondary of transformer 5 and is so biased that the tube is normally nonconducting and becomes conducting only in case the current flowing in the test circuit and primary of this transformer exceeds the current capacity of ammeter 3 or is such as to cause damage thereto. Other refinements and details of the apparatus will be mentioned after the general operation is described. In case 14 is a D.-C. supply, the transformer 18 and rectifiers 17 may be replaced by a suitable tapped resistor.

A test operation is started by closing switch 11. The switch blade 4 is generally not essential and serves merely to disconnect the test circuit from the test voltage, and might be omitted or made separate from switch 11. The closing of switch 11 energizes the test circuit through contacts at 8 of relay 10, so that current does not initially flow through ammeter 3. The coil of this relay 10 is also energized, but the relay does not immediately operate because its armature member is weighted as by a weight represented at 19, so that it delays its pull-up operation for two or three cycles of the 60-cycle source 14 or an equivalent time.

If, now, the current through the test circuit and impedance 1 does not exceed the current rating of ammeter 3, tube 16 will not fire and after a short delay, which is not perceptible to the operator, relay 10 pulls up and opens the contacts at 8 and closes the contacts at 9, so that the test circuit current flows through and is measured by the ammeter 3.

To avoid arcing at the relay contacts and reduce current surges in the test circuit, it is preferable that the contacts at 9 close before the contacts at 8 are fully opened. The operator then notes the current value from the ammeter 3, opens switch 11, removes the tested impedance 1, and inserts another impedance to be tested in the test circuit and proceeds as before. If, upon the closing of switch 11 in any such test, the tested impedance has such a low value that the current therethrough exceeds the current rating of ammeter 3, the secondary voltage of transformer 5 increases to a value that causes the tube 16 to fire, energizing quick-acting relay 7 which operates and opens the test circuit at contacts 6 before the slow-acting relay 10 has had time to operate. The energizing circuit of relay 10 is also opened at contacts 13 of relay 7. Hence, no current flows through ammeter 3 and it is not damaged, and relay 10 remains in the normal, deenergized position.

The operation of relay 7 closes the circuit of a signal 20 through contacts at 21 receiving its energy from source 14. The signal 20 may be visual or audible, or both, as suits the circumstances. Upon the operation of the signal, the operator opens switch 11, removes the impedance 1 from the circuit and replaces it with the next impedance to be tested. Although the current through the tested impedance was not measured on ammeter 3, the operator knows by reason of the signal 20 that such impedance has too low a value to pass the test and it is marked or segregated accordingly.

Before proceeding with further tests of impedances at 1, it is necessary to extinguish tube 16 because, since it is of the gaseous type, it will remain conducting until reset. Tube 16 is extinguished by short circuiting it by momentary closure of a normally open push button type switch at 23. Relay 7 then drops out, opens the circuit of signal 20 and closes the test circuit at contacts 6 and the energizing circuit of relay 10 at contacts 13, and the circuit is ready for the next test. It is to be noted that should the switch 11 be closed and an impedance be connected in the test circuit at 1 when the relay 7 drops out, a normal testing operation will occur as previously described, because from an operation standpoint it is immaterial whether the test circuit and the energizing circuit of relay 10 be finally closed at switch 11 or the contacts at 6 and 13 of relay 7. Normally, switch 11 will be closed after the resetting of relay 7, but should the operator forget to open switch 11 or close it before resetting relay 7, no harm can result to the apparatus or ammeter 3, as the protective operating features are not changed by the sequence in which the switches mentioned are closed following an ammeter protective operation.

The apparatus is also designed to protect the ammeter 3 from damage in case current flow in the test circuit increases from a normal value to a value beyond the current capacity of the ammeter after the slow-acting relay 10 has pulled up. This might be caused by reason of the impedance at 1 developing a partial or complete short circuit while under test, or by an abnormal rise in the test voltage 12 during a test. In such a case, relay 7 is immediately energized and opens the switch contacts at 6 and 13 before the ammeter can be damaged by excessive heating or before the indicating pointer of the ammeter can be bent by slamming against the stop at the upper limit of its indicating scale. If the instrument pointer is indicating, say, 80 per cent full scale before such a short circuit condition occurs, it will generally strike the upper stop following the occurrence of a short circuit, but its acceleration is interrupted in time to prevent its being bent.

Attention is directed to the fact that following a protective operation by the operation of relay 7, should the operator reset the tube 16 by closure of switch 23 without opening switch 11 or removing the defective impedance 1 from the test circuit, or correcting whatever condition it was that caused the protective operation of the relay, the relay 7 does not drop out to restore the test circuit until switch 23 is released and has opened because current flows through the coil of relay 7 from its rectifier power supply so long as either tube 16 is conducting or switch 23 is closed. Thus, relay 7 does not drop out following a tube resetting operation until switch 23 is released. However, as soon as switch 23 is released, tube 16 will again fire if the current in the test circuit is excessive and immediately pull up relay 7, so that in spite of any mistakes that the operator might make in procedure following a protective operation of either of the types described, the ammeter at 20 remains protected. The protective circuit is therefore foolproof and is suitable for use by unskilled operators with a minimum of instruction and supervision.

A resistance 24 is provided in the positive side of the supply circuit to relay 7 and tube 16 to limit current flow to relay 7 to its normal value after capacitor 15 has discharged. The grid bias supply for tube 16 is provided for by the lower of the rectifier tubes at 17 and is separate from the main power supply of tube 16 furnished by the upper rectifier tube at 17. Thus the grid bias for tube 16 is due to current flow through the resistance at 25 and the grid leak resistances at 26 and 27. The arrangement shown acts as a desirable smoothing filter for the half-wave power supply for the grid circuit. The plate current of tube 16 does not flow through resistances 25, 26 and 27, and hence, the variation of current flow in the plate circuit of tube 16 and coil of relay 7 and the value of the charge on condenser 15 have a minimum influence on the grid bias of tube 17, and therefore the regulation is satisfactory.

The purpose of the condenser shown at 28 is to minimize the effect of surges caused by switching in the test circuit on the grid bias of tube 16. It is to be noted that the grid bias is adjustable by the adjustable tap on resistance 25, and that the primary of the current transformer 5 is adjustable for the purpose of adjusting the current value in the test circuit at which the protective relay means 16 and 7 will operate.

From the foregoing description, it is apparent that the apparatus first "samples" the current in the test circuit and if not greater than the capacity of the ammeter will automatically connect the ammeter in the circuit so that the current can be measured. However, should test current be in excess of the capacity of the ammeter, the current that is being "sampled" fires the tube 16, which prevents the time delay relay 10 from going through its time delayed operation which prevents the ammeter from being connected in the test circuit. At the same time, the test circuit is interrupted and a signal is operated to advise the operator of the situation.

If, after the meter has been connected in the test circuit, the current increases to above the ammeter capacity for any reason, the apparatus automatically opens the test circuit before damage results to the meter. Complete meter protection is provided and the apparatus is foolproof. Whether or not the test current is in excess of the current capacity of the meter is determined by the apparatus in the first positive quarter of the input wave, and hence, the time delay of relay 10 needs only to be of the order of two or three cycles of the frequency of the alternating test voltage. Such small time delay is not perceptible to the operator. The secondary voltage of transformer 18 is three or four times that necessary to operate relay 7. The condenser 15 is normally charged to the peak value of the secondary voltage of transformer 18, and the gaseous discharge tube is capable of carrying a high instantaneous current. The relay 7 is designed for quick-acting operation. Hence, when tube 16 fires, the voltage of the capacitor 15 is impressed across the relay 7 and the operation of the relay follows almost instantaneously.

In cases where the test circuit voltage is quite high and conditions are such that there is a tendency for arcing to occur when the test circuit is interrupted at contacts 6, it may be desirable to short circuit the ammeter instead of or in addition to opening the test circuit. In Fig. 1a, I have shown a normally open contactor 6a which may take the place of contactor 6 of Fig. 1, or be added to the operating member of relay 7 in addition to contactor 6. Contactor 6a is connected so as to short circuit the ammeter 3 when the relay 7 operates.

While the above description concerns the protection of an A.-C. ammeter, the apparatus is suitable with slight modification of the connections for the protection of other types of instruments, measuring circuits, relays, etc., both A.-C. and D.-C., and a few of these will now be described.

In Fig. 2, the connections are shown for the protection of an A.-C. voltmeter or other A.-C. voltage sensitive circuit against excessive voltage across a test or load circuit. The A.-C. test voltage source 12 is to be connected to voltage terminals at 30. The relay 10 may be the same relay 10 of Fig. 1. Only one contactor, here designated as 31, is used for the purpose of delaying connecting the A.-C. voltmeter 32 across the test circuit. The voltmeter connection controlled by relay 10 is connected on the load side of the contactor 6 of relay 7 instead of on the supply side, so that if and when relay 7 operates, voltmeter 32 is disconnected. The transformer 5a takes the place of transformer 5 of Fig. 1 and will usually be a high impedance voltage transformer instead of a low impedance current transformer. A resistance potentiometer instead of a transformer could also be used. The remainder of the apparatus, not shown in Fig. 2, will be the same as in Fig. 1.

For the protection of either an A.-C. or a D.-C. voltmeter or the like, the apparatus and connections will be the same as for Fig. 2, except that in place of a transformer 5a a potentiometer resistance 33, as shown in Fig. 3, will be used between the test circuit and tube 16, and a D.-C.. voltmeter will replace the A.-C. voltmeter of Fig. 2.

For the protection of a D.-C. ammeter, the apparatus will be the same as in Fig. 1, except that in place of the current transformer 5 a current shunt 34 and, if necessary, a D.-C. amplifier 35 will be used between the test circuit and tube 16, as shown in Fig. 4, and a D.-C. ammeter will replace the A.-C. ammeter 3 of Fig. 1. In Figs. 1 and 4, the current transformer or shunt should in general be of low impedance for most test circuits where the ammeter protective scheme is to be employed.

It is to be noted that the protective scheme is of general application, requiring no changes except those desirable to adapt it to different types of meters and test or load circuits.

In the claims, I will refer to the load or test circuit as the load circuit and to the circuit to be protected as the metering circuit with the understanding that these terms are used in a broad sense consistent with the scope of the invention, and I may refer to the current, voltage, frequency or other condition of the load circuit to which the quick-acting relay is made responsive in a protective operation as the electrical condition of the load circuit.

In accordance with the provisions of the Patent Statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A system for protecting a metering circuit which is supplied from a load circuit, comprising a slow-acting relay having contacts connected to and for energizing the metering circuit when said slow-acting relay operates, a normally deenergized quick-acting relay having normally closed contacts in the load circuit through which the metering circuit is energized and normally closed contacts in the energzing circuit of said slow-acting relay, a switch for energizing the load circuit and the energizing circuit of the slow-acting relay, and a gaseous electron discharge tube having its output circuit connected to energize said quick-acting relay and its input circuit connected to be responsive to the electrical condition of the load circuit when energized for energizing the quick-acting relay only when the electrical condition of the load circuit is such as to require protection to the metering circuit in which case the quick-acting relay operates to deenergize the load circuit and the energizing circuit of the slow-acting relay in a period of time less than that required for an energizing operation of the slow-acting relay.

2. A system for protection of a metering circuit which is supplied from a load circuit, comprising a slow-acting relay having a contact connected to and for energizing the metering circuit when said slow-acting relay operates, a normally deenergized quick-acting relay having normally closed contacts in the load circuit through which the metering circuit is energized and normally closed contacts in the energizing circuit of the slow-acting relay, a switch for energizing the load circuit and energizing circuit of the slow-acting relay, a gaseous discharge tube normally biased to nonoperating condition in the energizing circuit of said quick-acting relay, and means responsive to the electrical condition of said load circuit when it is energized for altering the bias on said tube and causing the tube to fire and energize said quick-acting relay only when such condition is such as to require protection of said metering circuit.

3. A system for the protection of a metering circuit which is supplied from a load circuit, comprising a slow-acting relay having a contact connected to and for energizing the metering circuit when the slow-acting relay operates, a normally deenergized quick-acting relay having normally closed contacts through which the metering circuit is energized and normally closed contacts in the energizing circuit of the slow-acting relay, switching means for energizing the load circuit and the energizing circuit of the slow-acting relay, a gaseous discharge tube in the energizing circuit of the quick-acting relay normally biased to a nonconducting condition, means responsive to a predetermined electrical condition of said load circuit when it is energized for altering said bias to cause said tube to discharge and energize said quick-acting relay only when such electrical condition is such as to require protection of the metering circuit, and a normally open switch for short circuiting said tube and maintaining the quick-acting relay energized during such short circuiting action.

4. A system for the protection of a metering circuit which is supplied from a load circuit, comprising a slow-acting relay having contacts connected to and for energizing the metering circuit when the slow-acting relay operates, a normally deenergized quick-acting relay having normally closed contacts in the energizing circuit of the slow-operating relay and contacts connected so as to deenergize the metering circuit and contacts for energizing a signal circuit when said quick-acting relay operates, other switching means for energizing the load circuit and the slow-acting relay simultaneously, and means including a gaseous electron discharge tube responsive to a predetermined electrical condition of the load circuit when it is energized, connected to and for energizing the quick-acting relay, said means being adjustable and adjusted to cause the operation of said quick-acting relay only when the electrical condition is such as to require protection of the metering circuit.

5. A system for the protection of a metering circuit which is supplied from a load circuit, comprising a slow-acting relay having contacts and circuit connections for connecting the metering circuit to the load circuit when said relay operates, a normally deenergized quick-acting relay having normally closed contacts in the energizing circuit of the slow-acting relay, other switching means for simultaneously energizing the load circuit and the slow-acting relay operating circuit, means including a gaseous electron discharge tube responsive to an electrical condition of the load circuit when energized having connections to and for selectively energizing the quick-acting relay, said means being adjustable and adjusted to cause the operation of the quick-acting relay only when such condition requires the protection of the metering circuit, said quick-acting relay being effectively operated in response to such condition of the load circuit following a closure of said other switching means in a time period sufficiently short as to prevent the operation of said slow-acting relay and the connection of the metering circuit to the load circuit thereby.

STEVEN A. ZIMMERMANN.

REFERENCES CITED

The following references are of record in the file of this patent:

UNITED STATES PATENTS

| Number | Name | Date |
|---|---|---|
| 2,009,973 | Nelson | July 30, 1935 |
| 2,218,629 | Swart | Oct. 22, 1940 |
| 2,451,953 | Ingram | Oct. 19, 1948 |
| 2,460,860 | Volpigno | Feb. 8, 1949 |
| 2,473,344 | McCown | June 14, 1949 |

OTHER REFERENCES

Electronic Engineering, Jan. 1948, pages 26 and 27.

G. E. Review, Hot Cathode Thyratrons, vol. 32, No. 7.